(12) United States Patent
Ignatovich et al.

(10) Patent No.: US 9,958,355 B2
(45) Date of Patent: May 1, 2018

(54) APPARATUS AND METHOD FOR EVALUATION OF OPTICAL ELEMENTS

(71) Applicant: LUMETRICS, INC., Rochester, NY (US)

(72) Inventors: Filipp V. Ignatovich, Rochester, NY (US); Donald S. Gibson, West Henrietta, NY (US); Michael A. Marcus, Honeoye Falls, NY (US)

(73) Assignee: Lumetrics, Inc., Rochester, NY (US)

( * ) Notice: Subject to any disclaimer, the term of this patent is extended or adjusted under 35 U.S.C. 154(b) by 96 days.

(21) Appl. No.: 15/154,454

(22) Filed: May 13, 2016

(65) Prior Publication Data

US 2016/0252425 A1   Sep. 1, 2016

Related U.S. Application Data

(63) Continuation of application No. 14/674,748, filed on Mar. 31, 2015, now Pat. No. 9,341,541, which is a
(Continued)

(51) Int. Cl.
*G01B 9/00* (2006.01)
*G01M 11/02* (2006.01)

(52) U.S. Cl.
CPC ........ *G01M 11/0271* (2013.01); *G01M 11/02* (2013.01); *G01M 11/025* (2013.01);
(Continued)

(58) Field of Classification Search
CPC ......... G01M 11/0235; G01M 11/0271; G01M 11/0278; G01M 11/0285; G01M 11/02; G01M 11/0207; G01M 11/025
(Continued)

(56) References Cited

U.S. PATENT DOCUMENTS 6,130,419 A   10/2000  Neal
6,724,487 B2   4/2004  Marcus et al.
(Continued)

OTHER PUBLICATIONS

R. R. Rammage et al., "Application of Shack-Hartmann wavefront sensing technology to transmissive optic metrology," SPIE 2002 4779-27, pp. 1-12, Aug. 5, 2002, US. EFS file name 20161012_15-154454_IDS_NPL_Cite1.
(Continued)

*Primary Examiner* — Tri T Ton
(74) *Attorney, Agent, or Firm* — John M. Hammond; Patent Innovations LLC

(57) ABSTRACT

An apparatus for measuring the optical performance characteristics and dimensions of an optical element comprising a low coherence interferometer and a Shack-Hartmann wavefront sensor comprising a light source, a plurality of lenslets, and a sensor array is disclosed. The low coherence interferometer is configured to direct a measurement beam along a central axis of the optical element, and to measure the thickness of the center of the optical element. The light source of the Shack-Hartmann wavefront sensor is configured to emit a waveform directed parallel to and surrounding the measurement beam of the interferometer, through the plurality of lenslets, and to the sensor array. A method for measuring the optical performance characteristics and dimensions of a lens using the apparatus is also disclosed.

9 Claims, 11 Drawing Sheets

Related U.S. Application Data continuation of application No. 13/794,577, filed on Mar. 11, 2013, now Pat. No. 9,019,485.

(52) U.S. Cl.
CPC .... *G01M 11/0207* (2013.01); *G01M 11/0235* (2013.01); *G01M 11/0278* (2013.01); *G01M 11/0285* (2013.01)

(58) Field of Classification Search
USPC .................................................. 356/124–137
See application file for complete search history.

(56) References Cited

U.S. PATENT DOCUMENTS

| | | | |
|---|---|---|---|
| 7,583,389 B2 | 9/2009 | Neal et al. | |
| 2011/0134436 A1* | 6/2011 | Podoleanu | A61B 3/1015 356/512 |
| 2013/0301038 A1* | 11/2013 | Chan | G01M 11/0235 356/125 |
| 2014/0092395 A1* | 4/2014 | Fechner | G01M 11/0207 356/517 |

OTHER PUBLICATIONS

D.R. Neal et al., "Measurement of lens focal length using multi-curvature analysis of Shack-Hartmann wavefront data", Proc. of SPIE vol. 5523, pp. 243-255, (2004). EFS file name 20161012_15-154454_IDS_NPL_Cite2.

G.W.Forbes, "Characterizing the shape of freeform optics," Optics Express, vol. 20 No. 3, pp. 2483-2499, Jan. 30, 2012, US. EFS file name 20161012_15-154454_IDS_NPL_Cite3.

D.R.Neal et al., "Wavefront Sensors for control and process monitoring in optics manufacture.," SPIE, vol. 2993, pp. 211-220, Mar. 27, 1997, San Jose CA, US. EFS file name 20161012_15-154454_IDS_NPL_Cite4.

C.R.Forest etr al., "Metrology of thin transparent optics using Shack-Hartmann wavefront sensing," Opt. Eng. 43(3) 742-753, SPIE, (Mar. 2004), US. EFS file name 20161012_15-154454_IDS_NPL_Cite5.

* cited by examiner

APPARATUS AND METHOD FOR EVALUATION OF OPTICAL ELEMENTS

CROSS-REFERENCE TO RELATED PATENT APPLICATIONS

This application is a continuation of U.S. patent application Ser. No. 14/674,748, filed on Mar. 31, 2015 and issued as U.S. Pat. No. 9,341,541 on May 17, 2016, which is a continuation of U.S. patent application Ser. No. 13/794,577, filed on Mar. 11, 2013 and issued as U.S. Pat. No. 9,019,485 on Apr. 28, 2015, the disclosures of which are incorporated herein by reference.

BACKGROUND

Technical Field

The present invention relates to the metrology of optical elements, and in particular, the measurement of thickness, optical power and optical aberrations of lenses.

Description of Related Art

In the manufacturing of lenses, obtaining fast and accurate measurements of lens dimensions is a challenging problem. This is particularly the case for small low cost high volume lenses, such as contact lenses for the eye. Low-coherence interferometry (LCI) is one measurement technology that may be applied to this measurement problem.

LCI has applications in many fields from medical imaging to glass manufacturing. The low-coherence interferometry is based on using a light source with a very short coherence length. The light is split between two arms of an interferometer and then recombined and directed onto a detector. Interference occurs when the path lengths of the two arms of the interferometer are equal to within the coherence length of the light from the source.

There are numerous known configurations of such interferometers, such as the Michelson, Mach-Zehnder, and Fizeau interferometers, and others described in the text, *Principles of Optics: Electromagnetic Theory Of Propagation, Interference and Diffraction of Light*, M. Born and E. Wolf, Cambridge University Press, Cambridge; N.Y., 1999, 7th ed. Another example of such an interferometer is described in U.S. Pat. No. 6,724,487 of Marcus et al., "Apparatus and method for measuring digital imager, package and wafer bow and deviation from flatness," the disclosure of which is incorporated herein by reference. ("Marcus '487" subsequently herein.)

The interferometer disclosed therein by Marcus '487 is based on the use of piezo fiber stretching technology as the means of changing the optical path-length. A narrow beam of low-coherent light is directed onto the surface of the test object. It is common to focus the beam inside or in proximity to the test object. The reflected light from all of the object interfaces, which the beam traverses, is then collected and analyzed by the interferometer. The interferometer is used to extract the optical distances between the interfaces. The physical distances are obtained by dividing the optical distances by the group refractive indices of the material which makes up the space between the interfaces.

In a typical application, the light beam is directed along the optical axis of a lens. The axial thickness of the lens is then obtained by dividing the measured optical distance by the group refractive index of the glass or plastic material of the lens. Such measurement represents a point measurement, since only the distance between the two points (point of entry and exit of the measurement beam) is measured, while the information about the rest of the object (lens) is unknown.

When using LCI, it is possible, in principle, to move the measurement beam laterally with respect to its axial propagation, and to measure the thickness of the object (lens) at different locations. However, this approach is associated with difficulties, arising from the LCI requirements. One such requirement is to orient the measurement beam perpendicularly to the interfaces, to maximize the collection efficiency of the reflected beam. Not only is this difficult to do when just one interface is present, but in the case of two or more non-parallel interfaces (such as in a lens) such a requirement cannot be fundamentally satisfied. For most lenses, the only locations in which the two lens surfaces are parallel and able to be positioned perpendicular to the measurement beam are near the center of the lens. In order for the LCI to be able to measure effectively, the reflected light coming back from the lens must be within the numerical aperture of the lens and optical fiber. For most lenses, only the central region of the lens can be measured by using LCI. This is insufficient for the characterization of many lens products.

A wavefront sensor is a device for measuring the optical aberrations of an optical wavefront. This is accomplished by measuring the irradiance and phase distribution of the light beam at a particular plane in space. Although there are a variety of wavefront sensing technologies, including lateral shearing interferometers, curvature sensors, pyramid wavefront sensors, Focault knife-edge test, Ronchi test, and Shack-Hartman Wavefront Sensor (SHWFS), the SHWFS has been the most frequently employed, since it is capable of measuring both irradiance and phase distributions in a single frame of data.

U.S. Pat. No. 5,936,720 by Daniel R. Neal et al. entitled "Beam Characterization By Wavefront Sensor" issued on Aug. 10, 1999 and U.S. Pat. No. 6,130,419 by Daniel R. Neal "Fixed Mount Wavefront Sensor" issued on Oct. 10, 2000 describe the basics principles of operations of a wavefront sensor employing a two dimensional Shack-Hartman lenslet array; the disclosures of these patents are incorporated herein by reference. Further details on the use of Shack-Hartman wavefront sensors in optical metrology may be found in "Application of Shack-Hartmann wavefront sensing technology to transmissive optic metrology" by R. R. Rammage et al., *Proc. SPIE* Vol. 4779, Advanced Characterization Techniques for Optical, Semiconductor, and Data Storage Components, pp. 161-172, (2002).

U.S. Pat. No. 7,583,389 by Daniel R. Neal et al. entitled "Geometric Measurement System And Method Of Measuring A Geometric Characteristic Of An Object" issued on Sep. 1, 2009, describes a white light interferometer to measure surface curvature and or thickness of an object. This patent discloses the requirement of tilting of the object with respect to the interferometer apparatus and measuring at a variety of tilt angles in order to characterize a single surface of the object. The disclosure of this patent is incorporated herein by reference.

U.S. Pat. No. 7,623,251 by Daniel R. Neal et al. entitled "Geometric Measurement System And Method Of Measuring A Geometric Characteristic Of An Object" issued on Nov. 24, 2009 describes the use of wavefront sensing to measure surface curvature of an object on one or more surfaces. The measurement requires moving the object relative to the measurement apparatus and measuring at a variety of positions and/or angles in order to characterize the curvature of the one or more surfaces. The disclosure of this patent is incorporated herein by reference.

The disclosures of these patents notwithstanding, there remains an unmet need for a measurement apparatus and method that enables the non-contact measurement of lens or other optical element thickness and surface curvature of the top and bottom surfaces across a broad range of locations on the lens surface, along with the measurement of the optical aberrations of the lens or other optical component without the need of moving the lens or optical element with respect to the measurement apparatus during measurement. There also remains an unmet need to be able to measure the physical dimensions and optical performance parameters of multifocal and toric lenses. Such a measurement would inherently be faster since the sample would be static or not moving during the entire measurement procedure.

SUMMARY

In accordance with the present disclosure, the problem of measuring the physical dimensions and optical performance parameters of a lens or other optical element without contacting the lens or other optical element using a single instrument is solved by an apparatus comprising a low coherence interferometer, a wavefront sensor and an analyzer. The apparatus may further include a computer in signal communication with the low coherence interferometer and the wavefront sensor. The computer may include an algorithm to calculate a plurality of thickness dimensions of the optical element.

In a first aspect of the invention, an apparatus for measuring the physical dimensions and one or more optical performance parameters of an optical element is provided. The apparatus comprises a low coherence interferometer configured to direct a first beam of light along a defined axis of the optical element. The low coherence interferometer is adapted to measure the optical thickness of the optical element along the defined axis. The apparatus further comprises a wavefront sensor comprised of a light source and a sensor array. The light source is configured to emit a second beam of light surrounding the first beam of light which is directed through the optical element, and onto the sensor array. The wavefront sensor is adapted to measure wavefront deviations due to the presence of the optical element. The apparatus also comprises an analyzer to determine at least one of a physical dimension or an optical performance parameter of the optical element from the interferometer optical thickness measurement and the wavefront sensor wavefront deviations measurement.

In a second aspect of the invention a method for measuring the physical dimensions and one or more optical performance parameters of an optical element is provided. The method comprises the steps of providing a low coherence interferometer configured to direct a first beam of light along a defined axis of the optical element, and providing a Shack-Hartmann wavefront sensor comprising a light source, a plurality of lenslets, and a sensor array. The light source is configured to emit a second beam of light surrounding the first beam of light. The method also comprises the steps of directing the first beam of light along the defined axis of the optical element and measuring the thickness of the optical element along its defined axis using the low coherence interferometer. The method further comprises the steps of measuring the wavefront deviations due to the presence of the optical element using the Shack-Hartmann wavefront sensor and calculating at least one of a physical dimension or optical performance parameter of the optical element.

In a third aspect of the invention, a method for measuring the dimensions of a lens comprising a first surface and a second surface is provided. The method comprises the steps of measuring the thickness of the lens at the center of the lens with a low coherence interferometer; measuring the focal length of the lens with a Shack-Hartmann wavefront sensor; communicating the thickness of the lens and the focal length of the lens to a computer; calculating the radius of curvature of the first surface of the lens and the radius of curvature of the second surface of the lens using an algorithm contained in the computer to obtain the dimensions of the lens, and performing at least one of storing in in a non-transitory computer storage medium, communicating externally, or displaying the dimensions of the lens on a display.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

The present disclosure will be provided with reference to the following drawings, in which like numerals refer to like elements, and in which.

Figure 1:
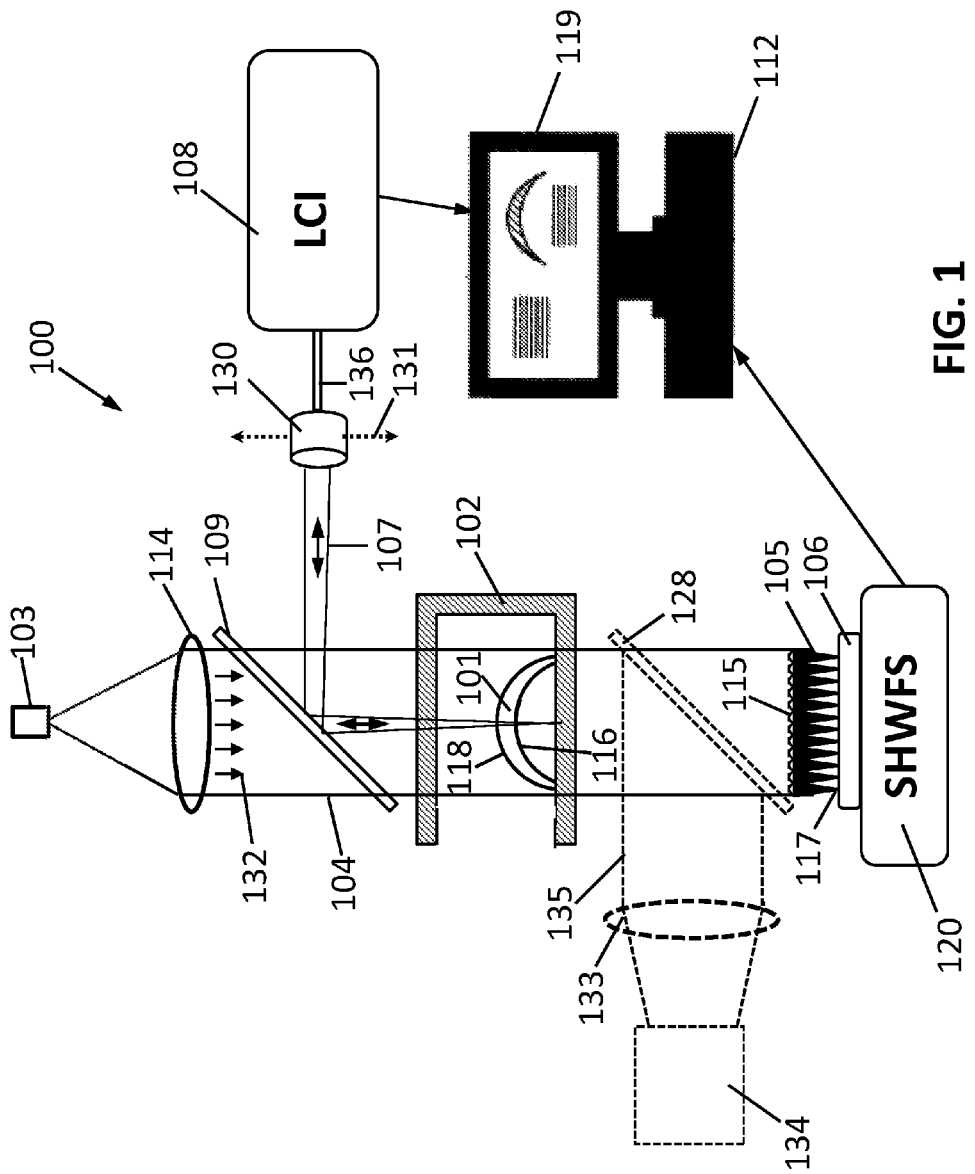
FIG. 1 shows a schematic block diagram of a lens or other optical component measurement apparatus in accordance with one embodiment of the invention.

The present invention will be described in connection with certain preferred embodiments. However, it is to be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION

The present description is directed in particular to elements forming part of, or cooperating more directly with, apparatus in accordance to the invention. For a general understanding of the present invention, reference is made to the drawings. It is to be understood that elements not specifically shown or described may take various form well known to those skilled in the art. Figures shown and described herein are provided in order to illustrate key principles of operation of the present invention and are not drawn with intent to show actual size or scale. Some exaggeration, i.e., variation in size or scale may be necessary in order to emphasize relative spatial relationships or principles of operation.

In the drawings, like reference numerals have been used throughout to designate identical elements. In the following disclosure, the present invention is described in the context of its use as an apparatus and method for measuring the thickness of lenses. However, it is not to be construed as being limited only to use in lens measurement. The invention is adaptable to many other uses for measurement of transparent objects having non-parallel surfaces. Additionally, this description may identify certain components with the adjectives "top," "upper," "bottom," "lower," "left," "right," etc. These adjectives are provided in the context of use of the apparatus as a lens measurement device, and in the context of the orientation of the drawings, which is arbitrary. The description is not to be construed as limiting the apparatus to use in a particular spatial orientation. The instant apparatus may be used in orientations other than those shown and described herein.

Turning now to FIG. 1, an exemplary embodiment of the Applicants' apparatus 100 for measuring the physical dimensions and one or more optical performance parameters of a lens or other optical component is shown. Using this apparatus 100, the absolute thickness distribution over the entire surface area of the lens 101 or other optical element 101 can be determined as well as the top and bottom surface profiles and radii of curvature of each of the outer surfaces 116 and 118 of the optical element 101. The index of refraction of the optical element 101 is also measured. The optical performance characteristics that can be measured using this apparatus include optical power, focal length and optical aberrations including spherical aberration, chromatic aberration, astigmatism, coma, field curvature, and distortion.

The apparatus 100 is comprised of a low coherence interferometer (LCI) 108 and a Shack-Hartman wavefront sensor (SHWFS) 120. The optical element 101 under test is placed in a cuvette 102 or another type of holder used to position the optical element 101 into the measurement location in the apparatus 100.

The optical element 101 may be a lens, e.g., a contact lens 101 for fitment to an eye. The low coherence interferometer 108 includes a low coherence light source which transmits low coherence light through optical fiber 136 which is input into optical probe 130. Optical probe 130 directs and focuses the low coherence light, herein called a first beam of light 107, onto the optical element 101. Some of the first beam of light 107 passes through the optical element 101, and some of the first beam of light 107 is reflected off of each optical interface 116 and 118 of the optical element 101. A transport mechanism 131 comprising a pair of perpendicular transport stages and controllers is coupled to the optical probe 130 which allows positioning of the optical probe 130 so the first beam of light 107 is directed along a defined axis of the optical element 101 during measurement. The term "defined axis" is used to denote locations on the optical element 101 where the top and bottom surfaces 116 and 118 of the lens/element 101 are most parallel.

The low coherence interferometer 108 is configured to direct a first beam of light or low coherence measurement beam 107 along an axis which coincides with the defined axis of the optical element 101, and to measure the thickness of the optical element 101 along the defined axis. When testing an axially symmetric optical element such as a spherical lens, the defined axis is preferably the center of the lens. When testing a cylindrical lens the defined axis may be centered anywhere along the cylinder's length. When testing an arbitrary optical element, the defined axis is any location where two or more surfaces of the optical element are parallel. Multifocal and toric lenses can have more than one defined axis.

The light source 103 of the Shack-Hartmann wavefront sensor 120 is configured to emit a second beam of light or wavefront light beam 104 surrounding and encompassing and preferably directed parallel to the measurement beam 107 of the interferometer 108, through a plurality of lenslets 115, and to a sensor array 106. The wavefront sensor 120 is adapted to measure wavefront deviations due to the presence of the optical element 101. The wavefront deviations are measured over the measurement window of the optical element 101 which is defined by the region of the optical element 101 that is imaged onto the wavefront sensor's sensor array 106.

During operation, an analyzer 112, which may be a computer, analyzes data obtained by the wavefront sensor 120 and low coherence interferometer 108 to determine the physical dimensions and optical performance parameters of the optical element 101. The analyzer 112 can also be utilized to determine the locations of the defined axes and to provide feedback to the transport mechanism 131 to properly position the first beam of light 107 so that the LCI measurement can be performed at the defined axes locations. The transport mechanism 131 has an encoder (not shown) which is calibrated to position the first beam of light 107 at the same absolute locations onto the optical element 101 as determined by the wavefront sensor's sensor array 106. The wavefront sensor 120 and the low coherence interferometer 108 share the same measurement window.

Figure 1A:
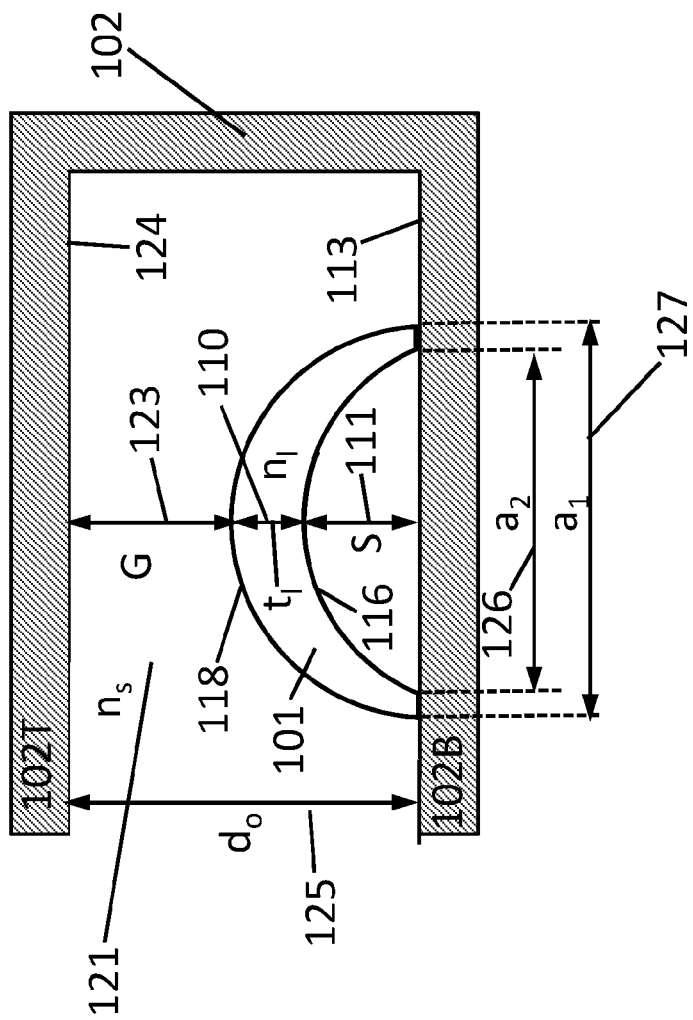
FIG. 1A shows an enlargement of the cuvette and lens under test shown in FIG. 1.
Figure 1B:
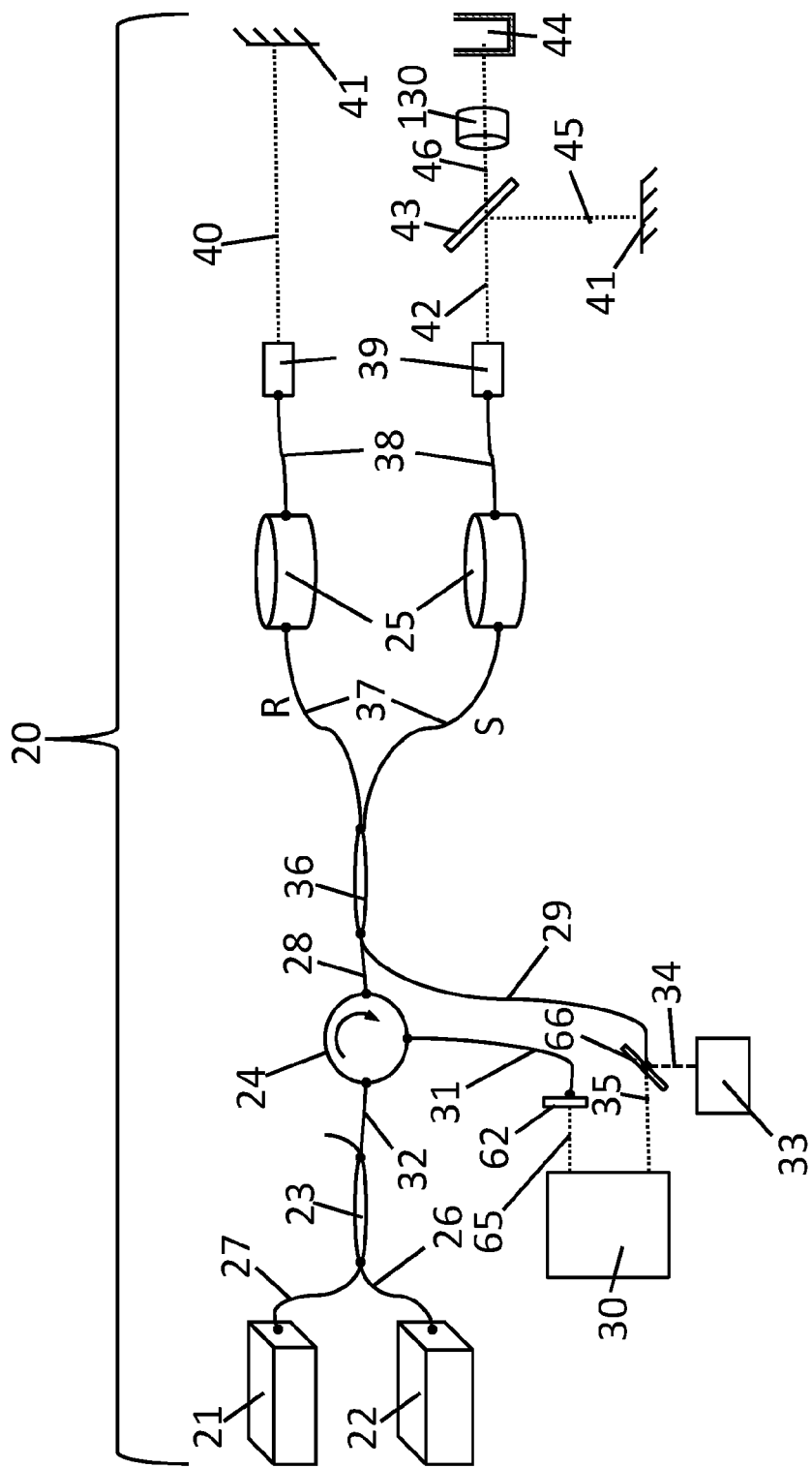
FIG. 1B shows an exemplary low coherence interferometer in a standard mode configuration in accordance a first embodiment of the invention.
Figure 1C:
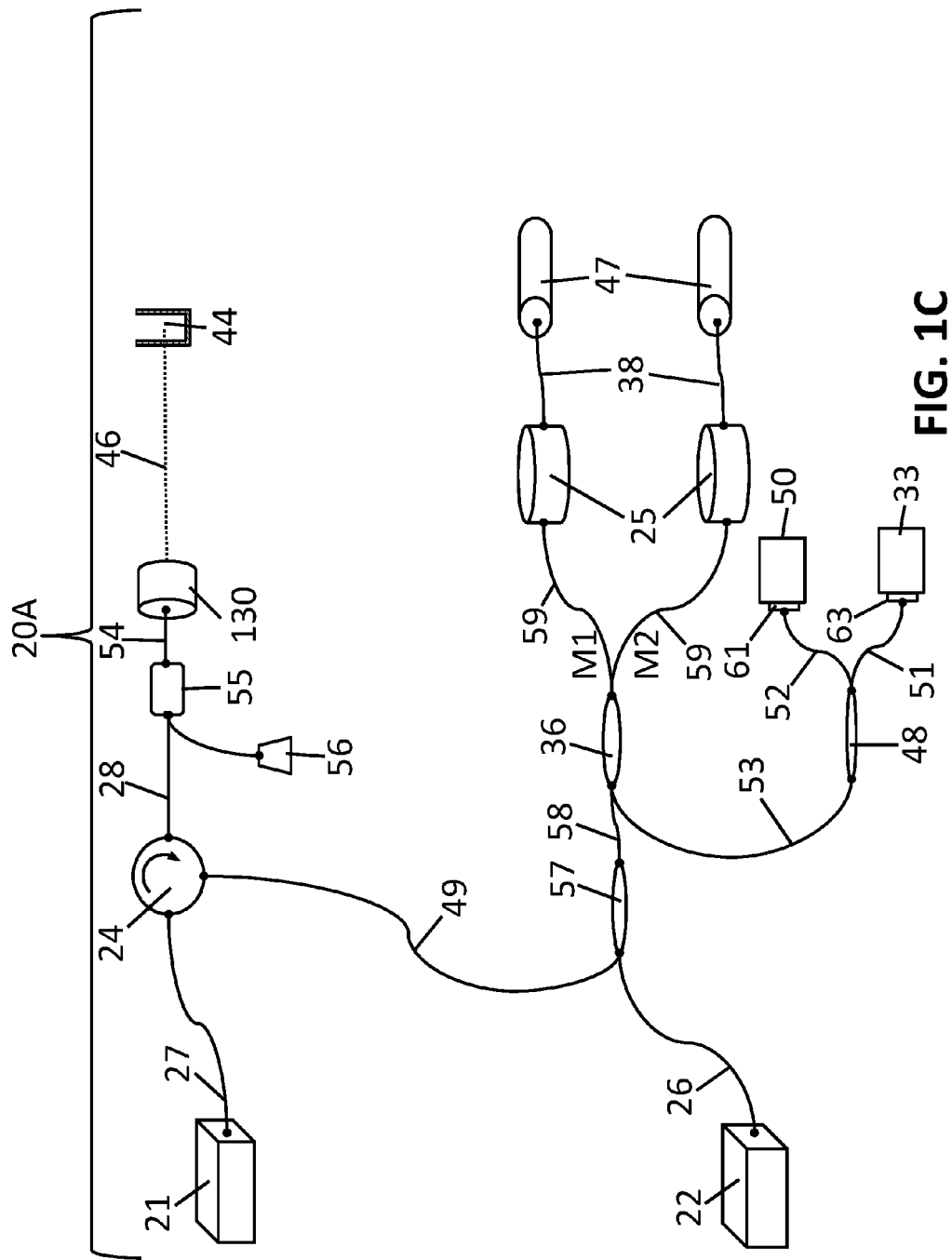
FIG. 1C shows an exemplary low coherence interferometer in an autocorrelation mode configuration in accordance with a second embodiment of the invention.

FIGS. 1B and 1C show further detail of exemplary dual low coherence interferometers 108 that can be used in accordance with embodiments of the invention. FIG. 1B shows a standard mode interferometer 20 and FIG. 1C shows an autocorrelation mode interferometer 20A. Parts with the same number in these two figures serve the same purpose. "Dual" refers to the fact that the instrument combines a laser interferometer with a low coherence interferometer as disclosed in Marcus '487. In a standard mode interferometer 20 as shown fin FIG. 1B, the sample arm is in one arm of a Michelson interferometer, while in the autocorrelation mode interferometer 20A shown in FIG. 1C, light that is sent to the sample is reflected back into the Michelson interferometer.

In the standard mode dual interferometer 20 shown in FIG. 1B, low coherence light from a low coherence light source 21 is coupled into optical fiber 27. Coherent light from coherent light source 22, typically a laser, is coupled into optical fiber 26. The coherent light and low coherence light are combined by light combiner 23 and travel together along optical fiber 32 which is input into optical circulator 24. An optical circulator is a three port device that functions as an optical isolator and allows light to propagate in one direction from the first port to the second port of the circulator and from the second port to the third port of the circulator, but not in the reverse direction. The clockwise arrow inside circulator 24 is to indicate the direction in which light will propagate. As an example, light entering from optical fiber 32 can travel into optical fiber 28, but not into optical fiber 31.

The combined light traveling along optical fiber 32 which is input into the optical circulator 24 exits the optical circulator 24 and travels along optical fiber 28 which is input into 2 by 2 coupler 36. The combined light passing through 2 by 2 coupler 36 is split and part of the combined light passes through each of the pair of fibers 37 which make up the two arms of a Michelson interferometer labeled R and S for reference arm and sample arm. Each arm of the Michelson interferometer has a fiber stretcher 25 which is comprised of an optical fiber wrapped around a piezoelectric cylinder which is used to change the path length in each of the two interferometer arms. The combined light travels through fibers 37 then through the fiber stretchers 25 into optical fibers 38 and through Faraday rotators 39. The Faraday rotators 39 function to rotate the polarization of the beam to compensate for the changes in phase of light which occur when light reflects from a surface.

In the reference arm R of the Michelson interferometer, the combined light passing through the Faraday rotator 39 becomes combined reference light beam 40. Combined reference light beam 40 is incident upon mirror 41 and is reflected back through the Faraday rotators 39 into optical fiber 38, fiber stretcher 25, back along fiber 37 and back into 2 by 2 coupler 36. In the sample arm S of the Michelson interferometer, the combined light traveling through the Faraday rotator 39 becomes combined light beam 42 which is incident upon a dichroic beam splitter 43. The dichroic beam splitter 43 is designed to reflect the coherent light as laser light beam 45 and to transmit the low coherence light as low coherence light beam 46. The coherent light beam 45 is incident onto mirror 41 and is reflected back into the dichroic beam splitter and back into the combined light beam 42, back through Faraday rotator 39, back into optical fiber 38, back into fiber stretcher 25, back along fiber 37 and back into 2 by 2 coupler 36. The low coherence light beam 46 passes through optical probe 130 and is incident on the sample chamber 44. Sample 44 is equivalent to the cuvette 102 shown in FIG. 1 and can be utilized with or without the optical element 101 under test installed in it.

Light is reflected from each of the optical interfaces of the sample 44 back into low coherence light beam 46, back through the optical probe 130, passing back through the dichroic beam splitter 43, back through combined light beam 42, back through Faraday rotator 39, back through optical fiber 38, back into fiber stretcher 25, back along fiber 37 and back into 2 by 2 coupler 36. The low coherence light that returns from each optical interface in the sample arm S of the interferometer and the reference arm of the interferometer R are recombined and made to interfere with each other as they enter 2 by 2 coupler 36. Constructive interference occurs when the optical path lengths of the two arms of the interferometer are equal and when they differ by the distance between the first and each of the other optical interfaces in the sample as described below with reference to the discussion of FIG. 2.

Similarly the coherent light returning from the mirrors 41 in the reference arm R and the sample arm S of the Michelson interferometer are recombined as they reenter 2 by 2 coupler 36 and interfere with each other. Since the light is coherent, the interference pattern is sinusoidal with a period of $\lambda/2$ where $\lambda$ is the wavelength of the coherent light source. Typically the zero crossings of the coherent light interferometer signal is used as a constant distance interval distance scale for sampling of the low coherence interferometer signal. Since the coherent light and the low coherence light are in different wavelength bands and are independent there is no mutual interference between the two types of light. Thus the coherent light interference is independent of the low coherence light interference.

After passing back through 2 by 2 coupler 36, the interfering coherent light and the interfering low coherence light are each split into two components traveling into optical fiber 29 and back through optical fiber 28. The interfering light returning through fiber 28 then passes back into the circulator 24 and is sent into optical fiber 31. The light traveling through optical fiber 32 is incident on a laser blocking filter 62, which passes the low coherence light as low coherence light beam 65, which is incident into one of the inputs of a balanced detector 30. The laser light beam is blocked by laser blocking filter 62.

Figure 2:
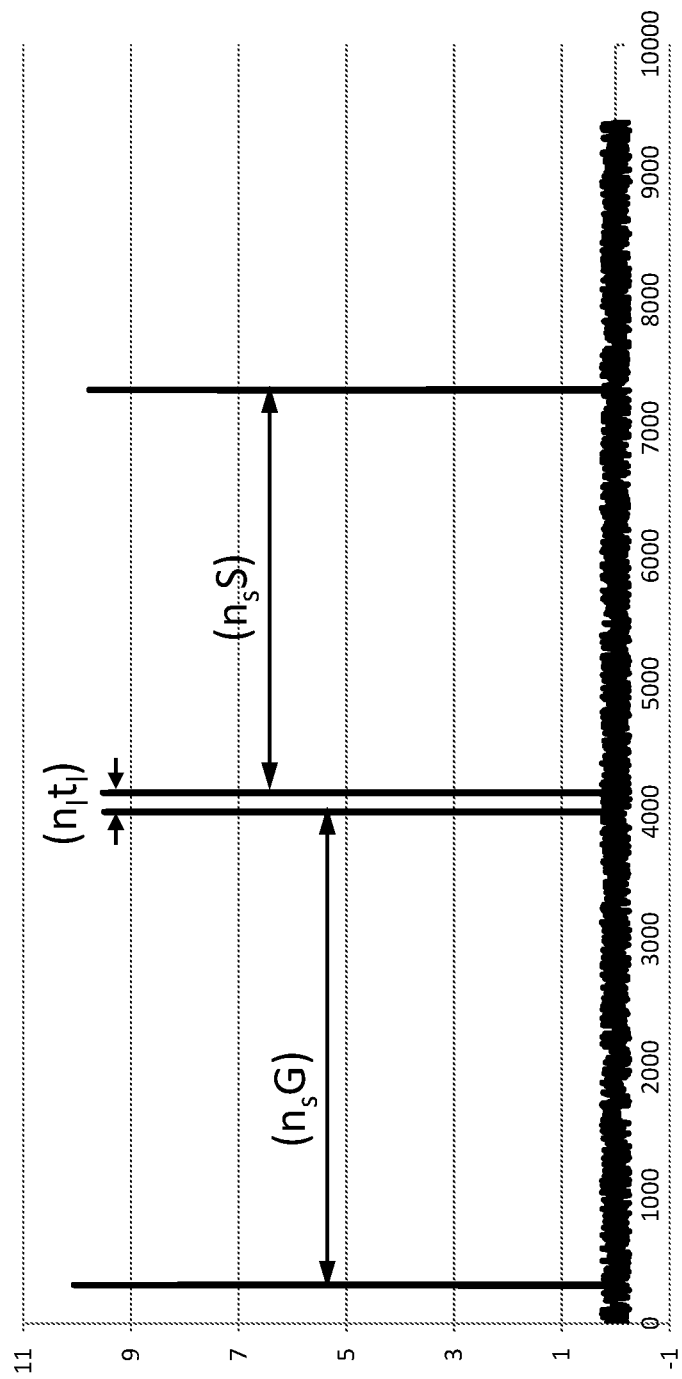
FIG. 2 shows an example of low coherence interferometer data obtained during measurement of a lens using the LCI apparatus of FIG. 1B.

The light traveling through optical fiber 29 is incident on a dichroic filter 66, which transmits the low coherence light as low coherence light beam 35 and reflects the coherent light as coherent light beam 34. The low coherence light beam 35 is incident onto the second input of the balanced detector 30, while the coherent light beam 34 is incident onto laser detector 33. FIG. 2 shows an example of low coherence interferometer data obtained while measuring a lens mounted in a cuvette after amplifying and filtering the signal received from the balanced detector 30 using the LCI apparatus of FIG. 1B.

FIG. 1C shows a dual interferometer in an autocorrelation mode. In this case light reflecting from the sample is input to both arms of a Michelson interferometer M1 and M2. Light from low coherence light source 21 is coupled into optical fiber 27, then passes through circulator 24 into optical fiber 28 through wavelength division multiplexer 55 into optical fiber 54, and then passes through optical probe 130 to form a low coherence light beam 46 which is incident on the sample 44. Low coherence light reflected off of each optical interface in the sample returns opposite to low coherence light beam 46 back through optical probe 130 into optical fiber 54, then wavelength division multiplexer 55, then back through optical fiber 28 and back into circulator 24. The light reflected off of each optical interface of the sample passes through circulator 24 into optical fiber 49 and then into the dual Michelson interferometer section of the interferometer apparatus 20A as it passes through wavelength division multiplexer 57 where it is combined with coherent light from coherent light source 22 traveling along optical fiber 26.

Combined light consisting of the low coherence light reflected from each of the optical interfaces in the sample 44 and the coherent light from coherent light source 22 from wavelength division multiplexer 57 travels along optical fiber 58 and into 2 by 2 coupler 36 where the light is split into 2 beams to travel along optical fibers 59 which make up the two arms M1 and M2 of the Michelson interferometer. Combined light traveling along optical fibers 59 are sent through the fiber stretchers 25 into optical fibers 38 and through Faraday rotators mirrors 47. The Faraday rotator mirrors 47 combine a Faraday rotator with a mirror. The combined light in each interferometer arm is reflected off of the Faraday rotator mirrors 47 and travels back along optical fibers 38 through fiber stretches 25 and optical fibers 59.

The respective reflected combined light streams in each arm M1 and M2 are recombined as they enter 2 by 2 coupler 36. The low coherence light returning from both arms M1 and M2 of the interferometer are recombined and made to interfere with each other as they enter 2 by 2 coupler 36. Constructive interference occurs when the optical path lengths of the two arms of the interferometer are equal and when they differ by the distance between different optical interfaces in the sample as described below with reference to the discussion of FIG. 2A. Similarly the coherent light returning from both arms M1 and M2 of the interferometer are recombined as they reenter 2 by 2 coupler 36 and interfere with each other. As in the case of the apparatus 20 shown in FIG. 1B, the coherent light interference pattern is sinusoidal with a period of $\lambda/2$ where $\lambda$ is the wavelength of the coherent light source, and the zero crossings can be used as a constant distance interval scale for sampling of the low coherence interferometer signal.

Figure 2A:
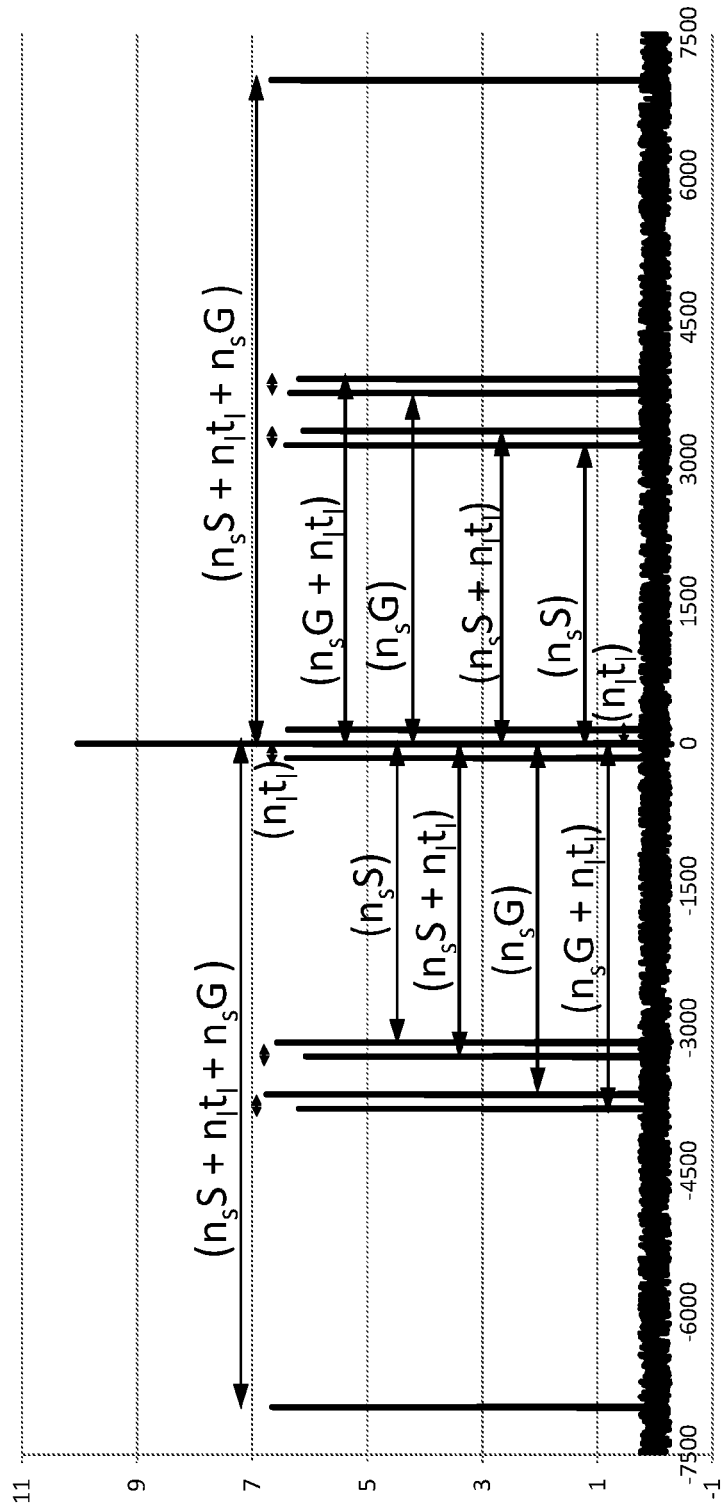
FIG. 2A shows an example of low coherence interferometer data obtained during measurement of a lens using the LCI apparatus of FIG. 1C.

As described previously for interferometer 20 of FIG. 1B, the low coherence light interference and the coherent light interference are mutually independent. Combined interfering coherent and low coherence light which passes back through 2 by 2 coupler 36 is coupled into optical fiber 53 and enters wavelength division multiplexer 48 which separates the low coherence light from the coherent light. The interfering low coherence light is sent through optical fiber 52 and is incident on detector 50 through optional filter 61 which blocks any remaining coherent light from entering the low coherence light detector 50. The interfering coherent light is sent through optical fiber 51 and is incident on detector 33 through optional filter 63 which blocks any remaining low coherence light from entering the coherent light detector 33. FIG. 2A shows an example of low coherence interferometer data obtained while measuring a lens mounted in a cuvette after amplifying and filtering the signal received from detector 50 using the LCI apparatus of FIG. 1C.

Using the apparatus 100, the optical power, the physical dimensions and optical aberrations of a contact lens may be measured. Optical power and optical aberrations define the optical performance parameters of a lens. Examples of optical aberrations are spherical, chromatic, astigmatism, coma, field curvature, distortion and others. In optics, the term waveform is used to denote the amplitude and phase of a light beam as a function of time and position. The wavefront of a light beam is defined as the locus of points having the same optical phase. The wavefront of a light beam can be defined as the virtual surface defined by the points on all possible rays in a light beam having equal optical path length from a spatially coherent source. As examples the wavefront of light emanating from a point light source is a sphere, and the wavefront created by an ideal collimating lens mounted at its focal length from a point source is a plane.

Referring again to FIG. 1, the SHWFS 120 is comprised of an array 105 of closely spaced microlenses 115 (referred to herein as a lenslet array) to probe the incoming wavefront, i.e., the light directed to the array 105. The lenslet array 105 focuses the incoming light into an array of focal spots 117. The location of the spots 117 depends on the orientation of the incoming wavefronts. As such, the lenslet array 105 translates the phase of the incoming light into a lateral shift of the focal spots 117.

The SHWFS 120 is further comprised of a sensor array 106 such as a 2-dimensional CCD or CMOS imager, which is used to determine the locations and extent of the shift of the focal spots 117. The amount of shift of each spot 117 may then be used to find wavefront orientation at each respective lenslet 115 location. From this information, the overall wavefront can then be reconstructed. Further details on the use of a Shack-Hartman wavefront sensor in optical metrology may be found in "Application of Shack-Hartmann wavefront sensing technology to transmissive optic metrology," R. R. Rammage et al., *Proc. SPIE* 4779, Advanced Characterization Techniques for Optical, Semiconductor, and Data Storage Components, 161. One may also refer to U.S. Pat. No. 5,936,720, "Beam characterization by wavefront sensor," and U.S. Pat. No. 6,130,419, "Fixed mount wavefront sensor," the disclosures of which are incorporated herein by reference.

When an optical element 101, such as contact lens 101, is tested and measured using the apparatus 100, a known waveform is directed onto the element 101. The transmitted waveform is analyzed using the SHWFS 120, and the difference between the incident and transmitted waveforms is used to extract optical properties of the element 101. As an example, the lens focal length can be calculated from data provided by the SHWFS 120 as described in the article, "Measurement of lens focal length using multi-curvature analysis of Shack-Hartmann wavefront data", Daniel R. Neal, James Copland, David A. Neal, Daniel M. Topa, Phillip Riera, Proc. of SPIE Vol. 5523, pp. 243-255, (2004), subsequently referred to herein as Neal et al. When the physical information about the element 101 is not known exactly, i.e. it is not possible to construct the physical model of the element 101 based purely on the wavefront analysis performed by the SHWFS 120 alone. For example, the lens thickness and thickness variations throughout the lens 101 as well as the lens index of refraction and individual radii of curvature of the surfaces 116 and 118 making up the lens cannot be obtained using only the SHWFS 120.

Advantageously, however, the combination of the LCI 108 and the SHWFS 120 in the Applicants' apparatus 100 enable the measurement of optical element thickness and optical performance parameters. This will now be explained with reference to FIG. 1 and FIG. 1A, using the example of measurement of a contact lens. It is to be understood that that the defined axis is the center of the lens 101 for the purposes of the discussion that follows.

Referring to FIG. 1A, details of the lens 101 mounted into the cuvette or holder 102 are shown. The lens 101 having an index of refraction $n_l$ and central thickness $t_l$ is placed inside the glass or plastic cuvette 102 with its concave surface 116 oriented downwardly, and its outer edge in contact with an inner surface 113 of the cuvette bottom section 102B. During measurement, the cuvette 102 is filled with a solution 121 having index of refraction $n_s$. Referring also to FIG. 1, the SHWFS 120 is further comprised of a light source 103 and a lens 114, which produce a second beam of light 104 with a known incident waveform having incident wavefront indicated by arrows 132. The light beam 104 passes through a dichroic mirror 109 and illuminates the lens 101. The light beam 104 passes through the top section 102T of the cuvette, the lens 101 and the bottom section 102B of the cuvette and is focused by the lenslet array 105 onto the sensor array 106.

In cases where all surfaces of the cuvette 102 are precision parallel surfaces they will have no effect on the wavefront of the light transmitted through the cuvette. In cases where the surfaces are not exactly flat and parallel, the wavefront $W_l$ can be measured with the cuvette 102 alone, and then with the lens present inside the cuvette, $W_{L+l}$. The differences between the wavefronts measured with the lens inside the cuvette and the cuvette alone are then analyzed to arrive at the wavefront deviations $W_l$ due to the lens. As a general practice, a reference wavefront $W_r$ is first measured through the cuvette without the lens being present before measuring the wavefront $W_{l+r}$ with the lens or other optical element being present.

The wavefront deviations due to the lens are then calculated and then analyzed to determine the lens focal length and optical performance parameters of the lens which include the optical aberrations of the lens. The optical performance parameters of the lens that can be analyzed include spherical aberration, chromatic aberration, astigmatism, coma, field curvature and distortion. Of particular importance is the slope of the wavefront deviations due to the lens. Locations on the lens surface at which the slope of the wavefront deviations is zero are locations where the two surfaces of the lens are parallel. The locations at which the slope of the wavefront deviations are zero coincide with the defined axes of the lens. The locations of the defined axes are locations at which the thickness of the lens will be measured with the low coherence light interferometer. For a spherical lens the location at which the slope of the wavefront deviations from the lens is zero corresponds to the center of the lens.

The low coherence light from LCI 108 is coupled to optical fiber 136 and is transmitted through optical probe 130 to direct a low coherence light beam 107 to the dichroic mirror 109 or other coupler, thereby combining the low coherence light beam 107 with the wavefront sensor light beam 104. In order to allow concurrent operation of the low coherence interferometer 108 and the SHWFS 120 the first beam of light 107 and the second beam of light 104 should be in distinctly different wavelength regions of the optical spectrum.

For example, the low coherence interferometer 108 may have a light source centered at around 1300 nm with a bandwidth of 30-100 nm and the SHWFS may have a light source in the visible part of the spectrum (400-700 nm). In this case, as shown in the embodiment of FIG. 1, the dichroic mirror 109 transmits light at wavelengths below a cutoff wavelength and reflects light at wavelengths above the cutoff wavelength. The light source 103 in apparatus 100 is used produce light of wavelengths predominately below the cutoff wavelength while the low coherence light beam is comprised of light entirely of wavelengths above the cutoff wavelength.

In a second example it is possible for the low coherence light source to be centered in the visible part of the spectrum and the SHWFS to be in the NIR part of the spectrum. In this case, the dichroic mirror 109 would transmits light at wavelengths above a cutoff wavelength and reflect light at wavelengths below the cutoff wavelength. The first beam of light 107 is then sent through the top section 102T of cuvette 102, the lens 101, and the cuvette bottom section 102B. A portion of the light beam 107 is reflected off of each of the optical interfaces that light beam 107 passes through and the reflected light that couples back into the optical probe 130 and back through optical fiber 136 and into the interferometer 108 is analyzed.

Optical probe 130 is preferably designed to focus light inside of the cuvette or holder 102. The optical reflections that are analyzed include the bottom or inner surface 124 of the cuvette top section 102T also called the first inner surface, the lens convex surface 118, the lens concave surface 116 and the top or inner surface 113 of the cuvette bottom section 102B also called the second inner surface. For the purposes of this discussion it is assumed that the thickness of the top and bottom surfaces of the holder 102T and 102B respectively are large enough so that the only reflections that occur in the interferometer scans from the holder 102 are from the optical interfaces that at the first inner surface 124 and the second inner surface 113.

The LCI 108 is used to calculate the central thickness 110 of lens 101 defined as $t_l$, as well as the distance 111 between concave surface 116 of lens 101 and inner cuvette surface 113 of cuvette bottom section 102B defined as S and distance 123 between the convex surface 118 of lens 101 and inner cuvette surface 124 of cuvette top section 102T defined as G in FIG. 1A. During operation, the low coherence interferometer 108 measures optical distances between each of the optical interfaces in the sample. The cuvette physical path length is d, at the location of the measurements. This can be measured in air first providing a result of $n_a d_o$ for the measured cuvette optical path length. The cuvette's physical path length $d_o$ is then determined by dividing the cuvette's measured optical path length ($n_a d_o$) by the known index of refraction of air $n_a$ at the wavelength of the low coherence light source.

The index of refraction of the solution $n_s$ at the measurement wavelength of the low coherence light source can then be determined by filling the cuvette 102 with solution 123. The measured optical path is now $n_s d_o$. The solution's index of refraction $n_s$ at the wavelength of measurement is then determined by dividing the measured optical path length of the cuvette filled with solution ($n_s d_o$) by the cuvette's physical path length $d_o$. Once the physical path length $d_o$ of the cuvette and the index of refraction $n_s$ of the solution are known, they can be used as constants in the calculations for lens index of refraction $n_l$ and lens thickness $t_l$.

When a lens is inserted into the measurement apparatus 100 and is properly centered, the measured optical distances are $n_s G$, the optical thickness corresponding to distance 123, $n_l t_l$ the measured optical thickness corresponding to lens center thickness 110 of lens 101 and $n_s S$, the measured optical distance corresponding to distance 111 as shown in FIG. 1A. FIG. 2 shows sample LCI data obtained using a standard mode interferometer such as the one shown in FIG. 1B during the measurement of a lens mounted in a cuvette filled with solution. The x-axis is in units of relative difference in length between the two arms of the interferometer in microns and the y axis is the intensity measured. Successive peaks in the interferometer trace occur when the path length of the reflected beam in the reference arm R is equal to the path length of the reflected beam from the sample arm S, which occur at each optical interface in the sample.

We define the measurement region as the region of interest in the test optical component plus optical component holder (lens surfaces+cuvette inner surfaces). The first peak from left to right shown in the interferometer trace of FIG. 2 is from the optical interface occurring at the inner surface 124 of cuvette top 102T. Similarly, the second peak from left to right is from the lens convex surface interface 118, the third peak from left to right is from the lens concave surface 116 and the fourth peak from left to right is from the top surface 113 of cuvette bottom 102B. The measured parameters $n_s G$, $n_l t_l$ and $n_s S$ which are defined as the distances between adjacent peaks in the interferometer data are shown in FIG. 2 using a standard mode low coherence interferometer. FIG. 2A shows similar data for a low coherence interferometer configured in an autocorrelation mode. The lens thickness $t_l$ and index of refraction $n_l$ are calculated from the relationships $$t_l = d_o - (n_s S)/n_s \qquad (1)$$

and $$n_l = (n_l t_l)/t_l \qquad (2)$$

in which the parameters shown in parenthesis are the measured values shown in FIG. 2 and FIG. 2A.

FIG. 2A shows sample LCI data obtained using an interferometer configured in the autocorrelation mode such as the one shown in FIG. 1C during the measurement of a lens mounted in a cuvette filled with solution with the measured parameters which are defined as the distances between adjacent peaks in the interferometer data. The x axis is the path length difference between the two arms of the interferometer in microns and the y axis is the intensity measured. Since the sample is in the input arm of the interferometers, reflections occurring at each of the optical interfaces of the sample interfere with each other in the autocorrelation interferogram as shown in FIG. 2A. The interferogram is symmetric about the origin which is defined as the location at which the path lengths of the two arms of the interferometer are equal. When the two arms of the interferometer M1 and M2 in FIG. 1C have equal path lengths all of the optical interfaces in the sample interfere with each other causing the zero crossing beak to have the largest amplitude. As the path lengths of the two arms in the interferometer are changed, peaks occur in the autocorrelator interferogram at optical path differences equal to optical distances between the various surfaces in the measurement region in order of increasing optical path difference between the surfaces. For the case of the lens shown in FIG. 1A mounted in cuvette 102, peaks occur at optical path differences of $\pm n_l t_l$, $\pm n_s S$, $\pm(n_s S + n_l t_l)$, $\pm n_s G$, $\pm(n_s G + n_l t_l)$ and $\pm(n_s S + n_l t_l + n_s G)$ in order of increasing (decreasing) optical path difference between optical interfaces in the measurement region of the optical component under test.

The data from the SHWFS 120 and the LCI 108 are communicated to an analyzer which may be comprised of a computer 112, which further analyzes the data and displays the results on display 119. The computer can be used for external communications and also comprises a non-transitory storage medium such as a hard drive which can be used for permanent storage of the data. (As used herein, the term "non-transitory storage medium" is meant to include all computer-readable media except for a transitory, propagating signal.) The analyzer also is used to provide feedback to the transport mechanism 131 to adjust the position of optical probe 130 to the proper defined axes measurement locations at which LCI measurements are performed.

Figure 3:
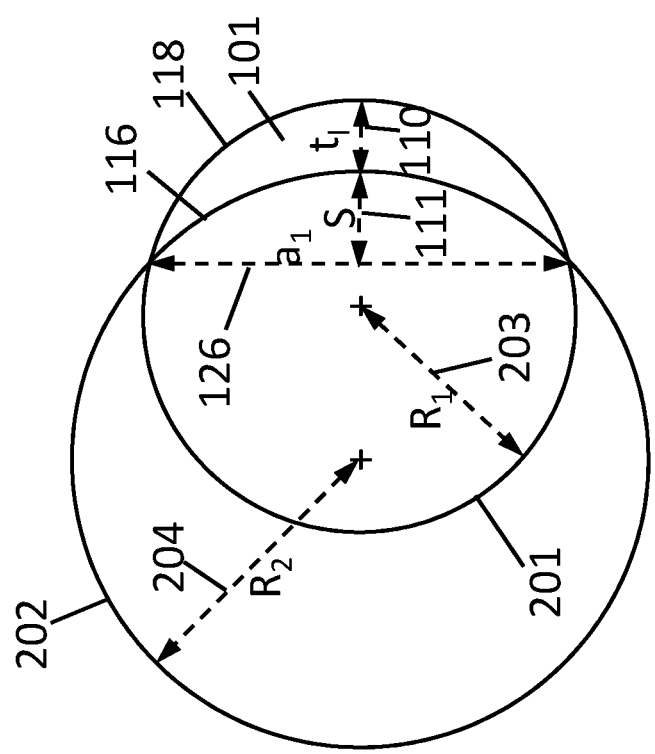
FIG. 3 shows a schematic illustration of a lens that may be measured by the Applicants' measurement apparatus.

On a fundamental level, the following equation may be used to determine the dimensions of the lens 101:

$$\frac{1}{f} = (n_l - 1)\left[\frac{1}{R_1} - \frac{1}{R_2} + \frac{(n_l - 1)t_l}{n_l R_1 R_2}\right] = P \qquad (3)$$

where P is the optical power of the lens, f is the focal length of the lens, $R_1$ is the radius of curvature of the lens surface closest to the light source and $R_2$ is the radius of curvature of the lens surface farthest from the light source. The sign of the lens' radii of curvature indicate whether the corresponding surfaces are convex or concave. $R_1$ is positive if the first surface is convex, and $R_1$ is negative if the first surface is concave. The signs are reversed for the second surface of the lens: $R_2$ is positive if the second surface is concave, and $R_2$ is negative if the second surface is convex. Additionally, referring to FIG. 3, the convex surface 118 of the lens 101 being measured is defined by sphere 201 having a radius of curvature 203 shown as $R_1$. Correspondingly, the concave surface 116 of the lens being measured 101 is defined by sphere 202 having a radius of curvature 204 shown as $R_2$. Also, $n_l$ is the refractive index of the lens material, and $t_l$ is the central thickness 110 of the lens 101.

When $R_1$, $R_2$, and $t_l$ are known, all physical dimensions of the lens can be determined. If the lens outer diameter $a_1$ and inner diameter $a_2$ defined in FIG. 1A as 126 and 127 respectively are measured along with the lens thickness $t_l$ and the distance S, the radii of curvature $R_1$ and $R_2$ can be calculated from the relationships $$R_1 = \left(\frac{a_1^2}{4} + (S + t_l)^2\right) / 2(S + t_l) \qquad (4)$$

and $$R_2 = \left(\frac{a_2^2}{4} + S^2\right) / 2S \qquad (5)$$

Figure 4:
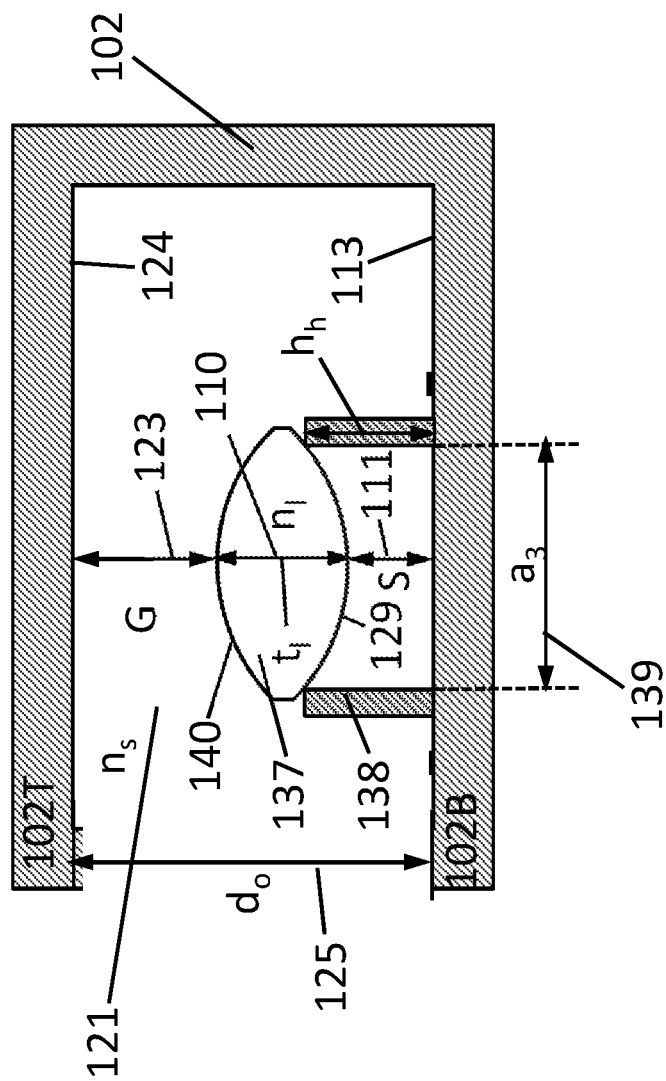
FIG. 4 shows an enlargement of a modified cuvette to measure a double convex lens using the apparatus shown in FIG. 1.

The lens inner and outer diameters $a_1$ and $a_2$ can be measured using the SHWFS or with an optional external image sensor 134 combined with the SHWFS as shown in FIG. 4. An optional beam splitter 128 is used to reflect a small percentage of the light beam 104 as reflected light beam 135. Referring also to FIG. 1, reflected light beam 135 passes through imaging lens 133 to form an image of the lens or optical element in the cuvette or holder on external image sensor 134. An image analyzer (not shown) is associated with the external image sensor 134 which receives images from the external image sensor 134 and can be configured to determine the diameter of the optical element 101. The diameters $a_1$ and $a_2$ can be calculated by counting the number of pixels between the inner diameters and outer diameters respectively and the known magnification factors of the imaging lens 133.

The image analyzer associated with the external image sensor 134 can also be configured to receive images from the external image sensor 134 in order to inspect the optical element 101 for defects. The focal length of a concave, convex lens or a double concave lens can be determined from the lens diameter measurement and the interferometer center thickness and index of refraction measurement. The external image sensor 134 can also be used to determine the location of the center or defined axis of the lens under test or other optical element. The coordinates can then be communicated via the analyzer 112 to move the transport mechanism 131 to properly position the first beam of light 107 at the defined axis location.

The apparatus shown in FIG. 1 can also be used to measure the physical and optical properties of double convex lenses as shown in FIG. 4. The lens 101 in FIG. 1 and FIG. 1A has been replaced with a double convex lens 137 having top convex surface 140 with radius of curvature $R_T$ and bottom convex surface 129 with radius of curvature $R_B$. The cuvette 102 now includes a lens holder insert 138 having an inner diameter 139 defined as $a_3$ and having a height $h_h$. The radius of curvature $R_B$ of lens 137 bottom convex surface 129 can be calculated using the relationship $$R_B = \left(\frac{a_3^2}{4} + (h_h - S)^2\right) / 2(h_h - S) \qquad (6)$$

In the case of measurement of double convex lenses, the low coherence interferometer 108 is used to measure S, the thickness of the lens $t_l$ and the index of refraction of the lens $n_l$. The radius of curvature $R_B$ of the bottom convex surface 129 is calculated using the known values for $a_3$ and $h_h$ and the measured value of S. The focal length of the lens can be measured from analysis of the wavefront data obtained with the wavefront sensor 120 as described in the reference by Neal et al. The radius of curvature $R_T$ of the upper convex lens surface 140 can then be calculated using equation 3.

When measuring double convex lenses, the external image sensor 134 is not required to measure the lens diameter. If the lens diameter is known, or measured with the external image sensor 134, then the top and bottom radii of curvature of the double convex lens 137 can be determined using the diameter information and the interferometer thickness and index of refraction measurement. The above equations can be programmed into an algorithm contained in computer 112, such that the dimensions of the lens 101 or other lenses can be calculated, stored in memory, communicated externally, and/or displayed on display 119.

In circumstances where the surfaces of the lens cannot be accurately described by two perfect intersecting spheres, corrections must be added to the above equations, to account for the deviations from perfect spheres. Such corrections may also be included in the algorithm executed by the computer 112.

The above method can be generalized to the measurement of thickness of any arbitrary shaped lens or optical component as a function of position on the optical component. This can be accomplished as long as the number of variables that are needed to analytically describe the top and bottom surfaces of the optical component is less than the resolution provided by the wavefront sensor.

Referring again to FIG. 1, the optical probe 130 may be mounted onto a transport mechanism indicated by arrows 131 to properly position the first beam of light 107 so that it coincides with the defined axis or center of the lens when thickness measurements are performed with the low coherence interferometer 108. In the case of the contact lens 101, the center of the lens would have the largest measured optical thickness. When the optical element under test has more than one defined axis, lens thickness measurements can be performed at each of the defined axes locations on the optical element. The thickness around a small region around each defined axis may also be measured to determine the position of the minimum or maximum thickness and to maximize or minimize the gap S. The transport mechanism 131 is may operate along two axes, and may include a position encoder (not shown) that is calibrated so that the position of first beam of light 107 on the optical element under test corresponds to the same position on the optical element 101 as determined from the SHWFS data. Alternatively, the optical cell or cuvette 102 could be mounted onto the transport mechanism 131 to position the lens at the defined or center axis or axes.

Figure 5:
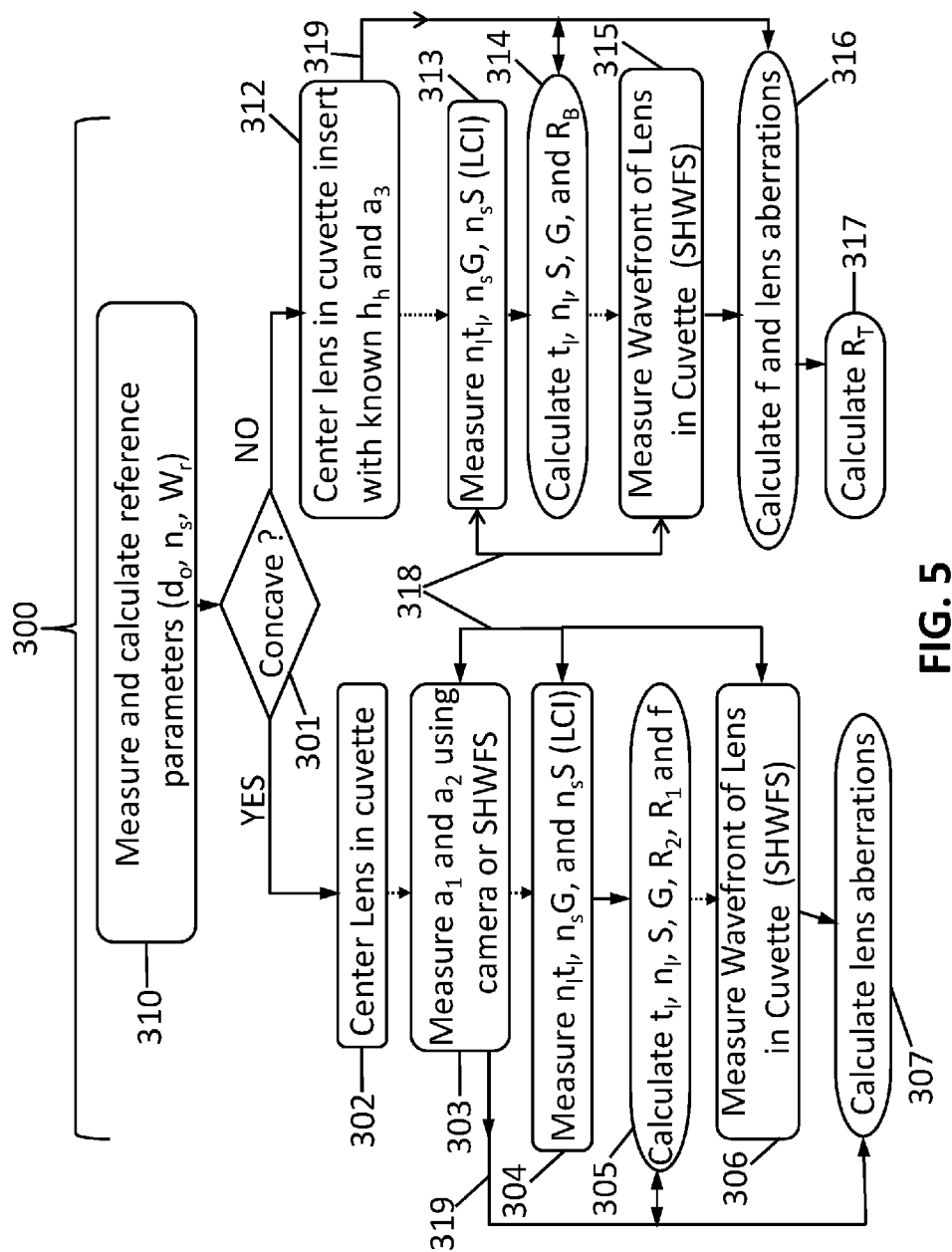
FIG. 5 shows a flow diagram showing the steps used for characterization of symmetric optical elements according to an embodiment of the invention.
Figure 6:
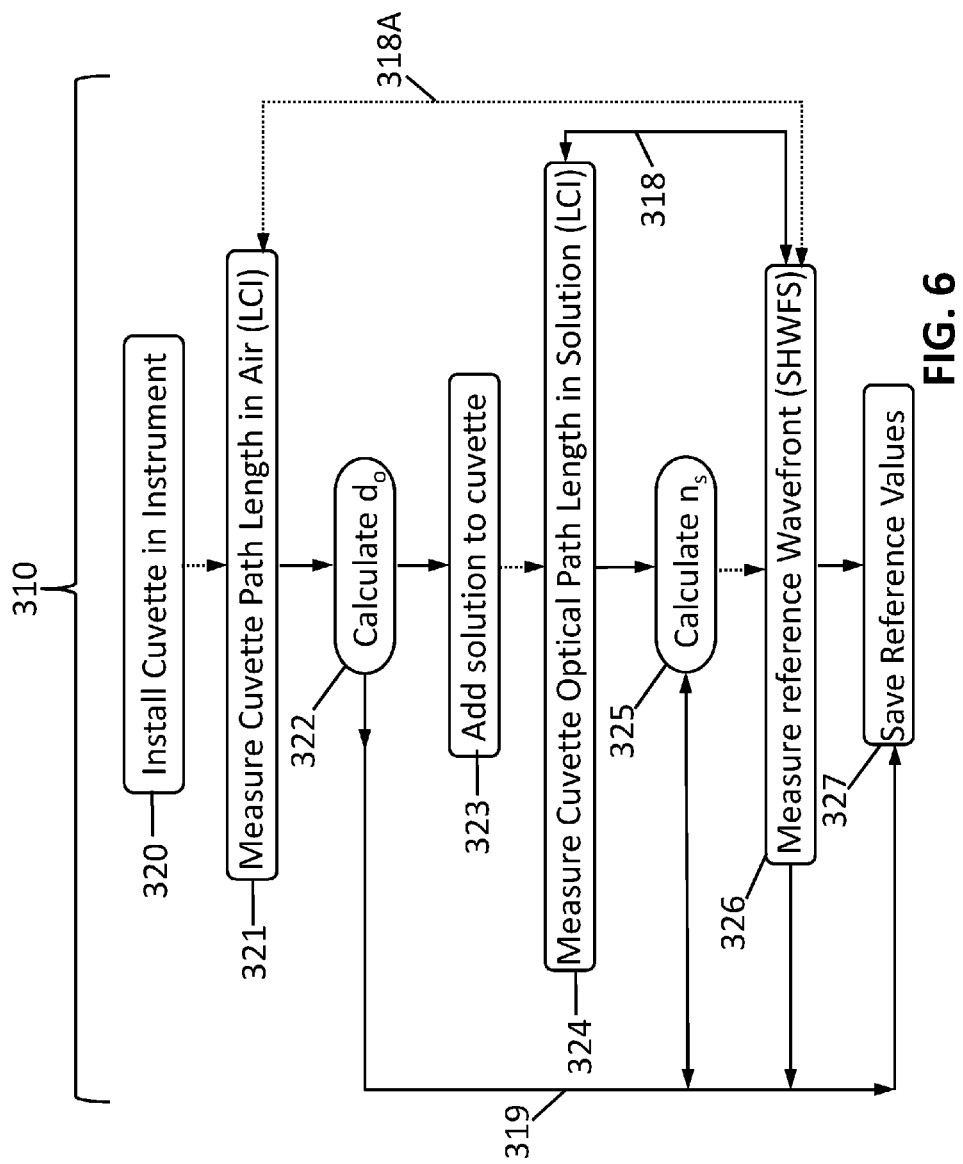
FIG. 6 shows a flow chart detailing the reference measurement step shown in FIG. 5 according to an embodiment of the invention.

FIG. 5 and FIG. 6 show flow diagrams 300 and 310 describing the steps used for characterization of symmetric optical elements according to the embodiment of the invention shown in FIG. 1. For the purposes of the discussion of the flow chart in FIG. 5, it is assumed that the symmetric optical element under test can be readily centered in the cuvette or measurement cell, and that the defined axis can be readily located. Arrows between adjacent steps in the flow diagrams indicate the order that the steps are performed while dotted arrows between adjacent steps indicate that there is one or more steps that may be performed concurrently or in any order or after the preceding step as described below. Arrows 318 indicate steps that can be performed concurrently or in any order, and arrows 319 are calculation dependency indicators. Steps with calculation dependency indicator arrows 319 entering the step box are dependent on previous calculated or measured values. The step sequences shown in FIGS. 5 and 6 are example sequences and are not meant to be limiting as will be described in the ensuing discussion of FIG. 5 and FIG. 6.

The first step 310 shown in FIG. 5 measures and calculates the reference parameters $d_o$, $n_s$ and the reference wavefront $W_r$ and is called the reference measurement step. Further details of reference measurement step 310 are shown in FIG. 6. The reference measurement step detail shown in FIG. 6 is broken up into further steps 320-327. In step 320 a cuvette 102 appropriate for the size of the optical elements to be measured is installed in the instrument shown in FIG. 1. Step 320 is shown to be followed by Step 321 in which the optical path length in air ($n_a d_o$) of the cuvette is measured using the low coherence interferometer 108. Step 322 follows Step 321 in which the cuvette's physical path length $d_o$ is then calculated by dividing the cuvette's measured optical path length in air by the index of refraction of air at the measurement wavelength of the LCI. Step 323 follows Step 322 in which lens measurement solution is added to the cuvette. Step 324 follows Step 323 in which the cuvette's optical path length in solution ($n_s d_o$) is measured using the low coherence interferometer. Following Step 324 is Step 325 in which the index of refraction of the solution $n_s$ is calculated by dividing the cuvette's measured optical path length in solution by the cuvette's physical path length $d_o$. The reference wavefront $W_r$ is measured in Step 326 using the Shack Harman Wavefront Sensor (SHWFS). The reference values are saved and stored for later use in subsequent calculations using the computer (step 327). Step 326 is independent of steps 321-325 as indicated by concurrent step indicator 318 and can occur either concurrently or before or after any of the steps 321-325 in sequence. Optional concurrent step indicator 318A is used to show that step 326 can be performed with the cuvette filled with either air or solution since it is assumed that the solution is homogeneous and will not affect the reference wavefront.

Referring back to FIG. 5, once the reference parameters $d_o$, $n_s$ and $W_r$ are measured, the details of the further operations are dependent upon the shape of the bottom surface of the lens or other optical component under test. Step 301 of FIG. 5 is a decision step in which steps 302-307 shown on the left side of FIG. 5 are performed if the bottom surface of the lens under test is concave, while step 312-317 shown on the right side of FIG. 5 are performed if the bottom surface of the lens under test is convex or flat. Types of optical elements in which Steps 302-307 are followed include concave-planar, convex-concave and double concave lenses. For the case of a lens with at least one concave surface the lens is centered in the cuvette as indicated in Step 302 with the concave surface facing downward as shown in FIG. 1A. Step 303 is shown to follow Step 302 in which the lens inner diameter $a_2$ and the lens outer diameter $a_1$ are measured using either the SHWFS or external imager. As indicated by the concurrent step indicator 318, steps 304 and/or 306 can also be performed simultaneously with Step 303. Also steps 303, 304 and 306 may be performed in any order. In Step 304 which is shown to follow Step 303, the low coherence interferometer (LCI) measures the optical thickness of the lens $n_l t_l$, the optical distance $n_s G$ and the optical distance $n_s S$ as described above in the discussion of FIG. 1A and FIG. 2. The measurements made in Step 304 can also be used to verify that the LCI measurement is being performed at the center of the lens by adjusting the position of the first beam of light 107 using transport mechanism 131 to maximize the distance $n_s S$. Step 305 follows Step 304 in which the parameters $t_l$, $n_l$, S, G, $R_2$, $R_1$ and f are calculated using equations 1-5 described above. In step 306, the SHWFS measures the wavefront $W_{l+r}$ of the lens centered in the cuvette. Step 306 is followed by Step 307 in which the wavefront deviations due to the lens $W_l$ are calculated and the lens aberrations are quantified using a wavefront analysis algorithm. The focal length of the lens f which was calculated in step 305 from the LCI data can also be calculated using the wavefront analysis algorithm during the performance of Step 307. If the two independent calculations of lens focal length f disagree, the lens most likely is not centered properly during the LCI measurement. During the performance of Step 307, the location at which the slope of $W_l$, the wavefront deviations of the lens is zero can also be used to verify that the LCI measurement is being performed at the center of the lens. If the location is incorrect, the position of the first beam of light 107 can be adjusted to the proper location using transport mechanism 131 as determined from the slope measurement of the SHWFS. The LCI measurements in Step 304 can then be repeated and the data reanalyzed. Although Step 306 with following step 307 are shown to occur after Step 305 in FIG. 5, they are independent of steps 303-305 and can occur either concurrently or before or after any of the steps 303-305 in sequence. Also, Step 304 is independent of Step 303 and they can occur either concurrently or in any order. The calculation dependency indicator 319 on the left side of FIG. 5 shows that the parameters obtained during performance of step 303 are required for obtaining the parameters in steps 305 and the values obtained during the performance of step 305 are useful for the calculations performed in step 307.

Referring again to step 301 in FIG. 5, when the bottom surface of the lens or other optical element is not concave, Steps 312-317 are performed to carry out the method of this embodiment of the invention. Types of optical elements in which steps 312-317 of FIG. 5 are performed include planar convex and double convex lenses. If the lens does not have a concave surface, Step 312 is performed by installing a lens holder insert into the cuvette with known height $h_h$ and diameter between the insert posts $a_3$ as shown in FIG. 4. The lens is then centered on the lens holder insert. Step 312 is shown to be followed by step 313 in which the low coherence interferometer measures the optical thickness of the lens $n_l t_l$, the optical distance $n_s G$ and the optical distance $n_s S$ as described above in the discussion of FIG. 1A and FIG. 2. Step 313 can also be used to verify that the LCI measurement is being performed at the center of the lens by adjusting the position of the first beam of light 107 using transport mechanism 131 to minimize the distance $n_s S$ and maximize the optical thickness $n_l t_l$ of the lens. As indicated by the concurrent step indicator 318, steps 313 and 315 can also be performed simultaneously or in any order. Step 314 follows Step 313 in which the parameters $t_l$, $n_l$, S, G, and $R_B$ are calculated using equations 1-2 and equation 6 described above. In step 315, the SHWFS measures the wavefront $W_{l+r}$ of the lens centered in the cuvette. Step 315 is followed by Step 316 in which the wavefront deviations due to the lens $W_l$ are calculated and the lens aberrations are quantified using a wavefront analysis algorithm. The lens focal length is also determined during step 316 from the wavefront analysis algorithm. During the performance of Step 315, the location at which the slope of $W_l$, the wavefront deviations of the lens is zero can also be used to verify that the LCI measurement is being performed at the center of the lens. If the location is incorrect, the position of the first beam of light 107 can be adjusted to the proper location using transport mechanism 131 as determined from the slope measurement of the SHWFS. The LCI measurements in Step 313 can then be repeated and the data reanalyzed. Step 316 is followed by Step 317 in which the radius of curvature of the top surface of the lens $R_T$ is determined. $R_T$ can be determined from equation 3 by substituting $R_2=R_B$ and $R_1=R_T$ and using the calculated values for f and $R_B$. Although Step 315 with following Step 316 are shown to occur after Step 314 in FIG. 5, they are independent of Steps 313-314 and can occur either concurrently or before or after any of the Steps 313-314 in sequence. As above, the calculation dependency arrow 319 on the right side of FIG. 5 shows the interdependencies between the various measured and calculated values.

Figure 7:
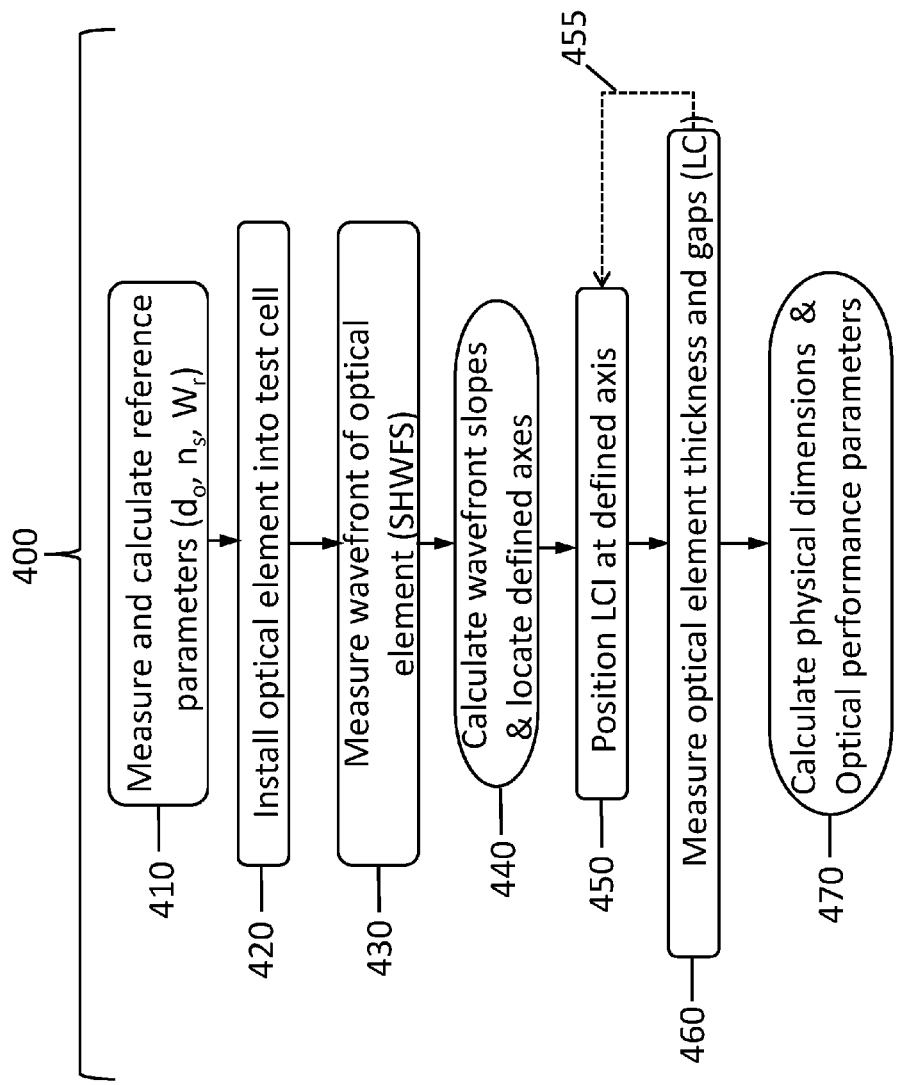
FIG. 7 shows a flow chart describing the steps used for characterization of arbitrary optical elements according to an embodiment of the invention.

FIG. 7 shows a flow chart 400 describing the steps used for characterization of arbitrary optical elements according to an embodiment of the invention. The first step 410 shown in FIG. 7 measures and calculates the reference parameters $d_o$, $n_s$ and the reference wavefront $W_r$ and is called the reference measurement step in the same manner as Step 310 in FIG. 5 and FIG. 6. Step 410 is followed by step 420 in which the optical element is installed into the test fixture which may be an optical cell or cuvette. Step 420 is followed by Step 430. In Step 430 the wavefront of the optical element is measured using the SHWFS or other wavefront sensor. Step 430 is followed by Step 440 in which the wavefront deviation due to the lens is calculated as well as the slopes of the wavefront deviation. Locations of the zeros in the slope are determined to identify the positions of the one or more defined axes. Step 440 is followed by Step 450. In step 450 the transport mechanism 131 is positioned so that the first beam of light 107 passes through the location of the first defined axis. The LCI measurement is then performed at the location of the first defined axis of the optical element. The optical thickness, gaps and index of refraction of the optical element at the location of the first defined axis are then calculated from the LCI data. If there is more than one defined axis, Steps 450 and 460 are repeated until all the defined axes locations have been measured. This is indicated by repeat dotted arrow Step 455. Once all of the defined axes locations have been measured to provide the physical thickness and height of the bottom surface and top surface of the optical element at the defined axes locations, Step 470 is performed which combines and analyzes the wavefront data obtained in step 430 together with the LCI data obtained in step 460 to calculate the physical dimensions and optical performance parameters of the optical element.

The apparatus and method of this invention provide much more information concerning the physical dimensions and optical performance parameters of an optical element than can be determined by wavefront sensing and low coherence interferometry alone or when measured independently of each other. The low coherence interferometer and the wavefront sensor share the same measurement window on the optical element and work in collaboration with each other to provide recursive feedback between the two measurement devices.

As an example in the measurement of a spherical lens, the wavefront sensor is used to determine the location of the defined axis and also measures the focal length and diameter of the lens. The first beam of light of the low coherence interferometer is moved to the defined axis location and the index of refraction $n_l$ and thickness of the lens at the defined axis location $t_l$ is measured and the focal length f of the lens is calculated from the diameter of the lens G, S and $n_l t_l$ along with the calculated radii of curvature $R_1$ and $R_2$ of the lens. The focal lengths of the lens determined from the wavefront sensor alone and from the interferometer alone are then compared, and the measurement location of the defined axis is readjusted recursively until the two sets of measurements agree.

In the case of measurement of multifocal optical elements, the collaborative nature of the instruments allows the location of each of the defined axes to be determined along with the shape and physical dimensions of the optical element. Combining the instrument with location feedback between the two instruments allows for improved accuracy and precision, since the same measurement locations can be determined and the LCI data can be used to provide an absolute distance scale for the wavefront data at defined locations on the optical element. The physical dimensions that are determined include the absolute thickness profile of the optical element across its surface, the top and bottom surface profiles, and radii of curvature of each of the outer surfaces of the optical element. The index of refraction is also measured. The optical performance characteristics that can be measured include optical power, focal length, and optical aberrations including spherical aberration, chromatic aberration, astigmatism, coma, field curvature, and distortion.

Although the apparatus and examples have been described herein as including a Shack-Hartmann wavefront sensor SHWFS, it is to be understood that other types of wavefront sensors may be utilized in the apparatus shown in FIG. 1. When using other wavefront sensors, lenslet array 105 may be replaced with another type of element. As an example in the case of a lateral shearing type interferometer setup, lenslet array 105 could be replaced with a birefringent crystal.

It is, therefore, apparent that there has been provided, in accordance with the present invention, a method and apparatus for measuring the dimensions of an optical element, such as a lens. Having thus described the basic concept of the invention, it will be rather apparent to those skilled in the art that the foregoing detailed disclosure is intended to be presented by way of example only, and is not limiting. Various alterations, improvements, and modifications will occur to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims.

PARTS LIST

20 Dual Interferometer
20 A Autocorrelation Mode Dual Interferometer
21 Low Coherence Light Source
22 Laser
23 light combiner
24 Circulator
25 Fiber Stretchers
26 Optical Fiber
27 Optical Fiber
28 Optical Fiber
29 Optical Fiber
30 Balanced Detector
31 Optical Fiber
32 Optical Fiber
33 Laser Detector
34 Laser Light to Detector
35 Low Coherence Light to Detector
36 2 By 2 Coupler
37 Optical Fibers
38 Optical Fibers
39 Faraday Rotators
40 Combined Reference Light Beam
41 Mirror
42 Combined Light Beam
43 Dichroic Beam Splitter
44 Sample
45 Laser Light Beam
46 Low Coherence Light Beam
47 Faraday Rotator Mirrors
48 Wavelength Division Multiplexer
49 Optical Fiber
50 Detector
51 Optical Fiber
52 Optical Fiber
53 Optical Fiber
54 Optical Fiber
55 Wavelength Division Multiplexer
56 Visible laser
57 Wavelength Division Multiplexer
58 Optical Fiber
59 Optical Fiber
61 Laser Blocking Filter
62 Laser Blocking Filter
63 Low Coherence Light Blocking Filter
65 Low Coherence Light to Detector
66 Dichroic Filter
100 Lens Measurement Apparatus
101 Lens Being Measured
102 Cuvette
102B Cuvette Bottom Section
102T Cuvette Top Section
103 Light Source
104 Second Beam of Light
105 Lenslet Array
106 Sensor Array
107 First Beam of Light
108 Low Coherence Interferometer
109 Dichroic Mirror
110 Lens Central Thickness
111 Distance between lens bottom surface and cuvette
112 Computer
113 Inner Surface of Cuvette Bottom
114 Lens
115 Microlens
116 Lens Concave Surface
117 Focal Spots
118 Lens Convex Surface
119 Display
120 Shack-Hartman Wavefront Sensor
121 Solution
123 Distance Between Lens Top Surface And Cuvette
124 Inner Surface of Cuvette Top
125 Cuvette Path Length
126 Lens Inner Diameter
127 Lens Outer Diameter
128 Beam Splitter
129 Lens Bottom Convex Surface
130 Optical Probe
131 Transport Mechanism
132 Wavefront 133 Camera Lens
134 External Image Sensor
135 Reflected Light Beam
136 Optical Fiber
137 Double Convex Lens
138 Lens Holder Insert
139 Lens Holder Inner Diameter
140 Lens Top Convex Surface
201 Convex Surface Sphere
202 Concave Surface Sphere
203 Convex Surface Radius of Curvature
204 Concave Surface Radius of Curvature
300 Flowchart
301 Decision Step
302 Step
303 Step
304 Step
305 Step
306 Step
307 Step
310 Reference Step
312 Step
313 Step
314 Step
315 Step
316 Step
317 Step
318 Concurrent Step Indicator
318A Optional Concurrent Step Indicator
319 Calculation Dependency Indicator
320 Step
321 Step
322 Step
323 Step
324 Step
325 Step
326 Step
327 Step
400 Flowchart
410 Step
420 Step
430 Step
440 Step
450 Step
455 Repeat Step
460 Step
470 Step

We claim:

1. A method for measuring a lens having a focal length and comprising a first surface and a second surface defining a lens thickness therebetween, the method comprising the steps of:

a) measuring the thickness of the lens at a center of the lens with a low coherence interferometer, wherein the low coherence interferometer is configured to direct a first beam of light along a defined axis of the lens;

b) measuring the focal length of the lens with a Shack-Hartmann wavefront sensor comprising a light source configured to emit a second beam of light and a plurality of lenslets placed in front of a sensor array;

c) communicating the thickness of the lens and the focal length of the lens to an analyzer computer;

d) calculating a radius of curvature of the first surface of the lens and a radius of curvature of the second surface of the lens using an algorithm executed by the computer to obtain dimensions of the lens; and e) performing at least one of storing in a non-transitory computer storage medium, communicating externally, or displaying the dimensions of the lens.

2. The method of claim 1, wherein the diameter and location of the center of the lens is measured with an image sensor which receives a portion of the second beam of light.

3. The method of claim 1, further comprising the step of calculating at least one optical performance parameter of the lens.

4. The method of claim 3, wherein the at least one optical performance parameter of the lens is selected from optical power, spherical aberration, chromatic aberration, astigmatism, coma, field curvature, prism, and distortion.

5. The method of claim 1, wherein measuring the thickness of the lens at the center of the lens further comprises measuring the optical thickness of the lens and calculating the thickness and index of refraction of the lens.

6. The method of claim 5 wherein the step of measuring the thickness of the lens at the center of the lens with a low coherence interferometer further comprises installing the lens in the inner volume of a cuvette and measuring the optical thickness of the lens.

7. The method of claim 6, wherein measuring the optical thickness of the center of the lens with the low coherence interferometer further comprises measuring an optical path from a top inner surface of the cuvette to a top of the center of the lens and an optical path from a bottom of the center of the lens to a bottom inner surface of the cuvette, and calculating the thickness and index of refraction of the lens.

8. The method of claim 7, further comprising measuring the optical path from the top inner surface of the cuvette to the bottom inner surface of the cuvette at the location of the center of the lens measurement location with the lens absent from the cuvette.

9. The method of claim 6 wherein the inner volume of the cuvette contains a liquid medium.

* * * * *